April 11, 1961     C. L. COOK     2,978,856
MOWER WITH SANDBLAST CUTTING MEANS
Filed Jan. 6, 1958     2 Sheets-Sheet 1
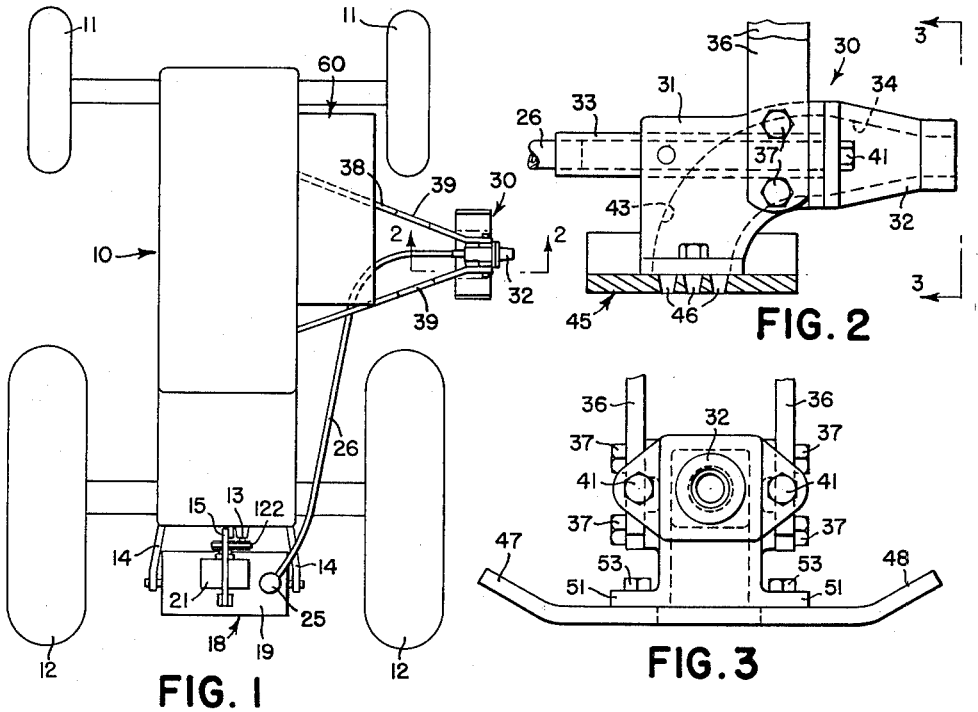
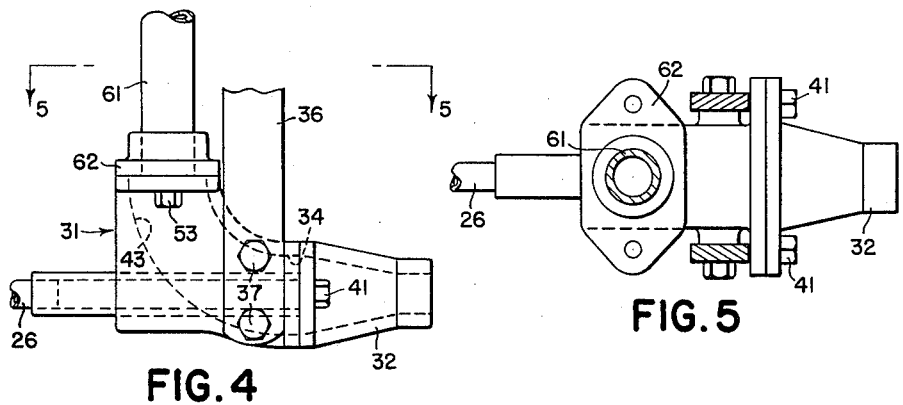
INVENTOR.
CURTISS L. COOK
ATTORNEYS April 11, 1961 C. L. COOK 2,978,856
MOWER WITH SANDBLAST CUTTING MEANS
Filed Jan. 6, 1958 2 Sheets-Sheet 2
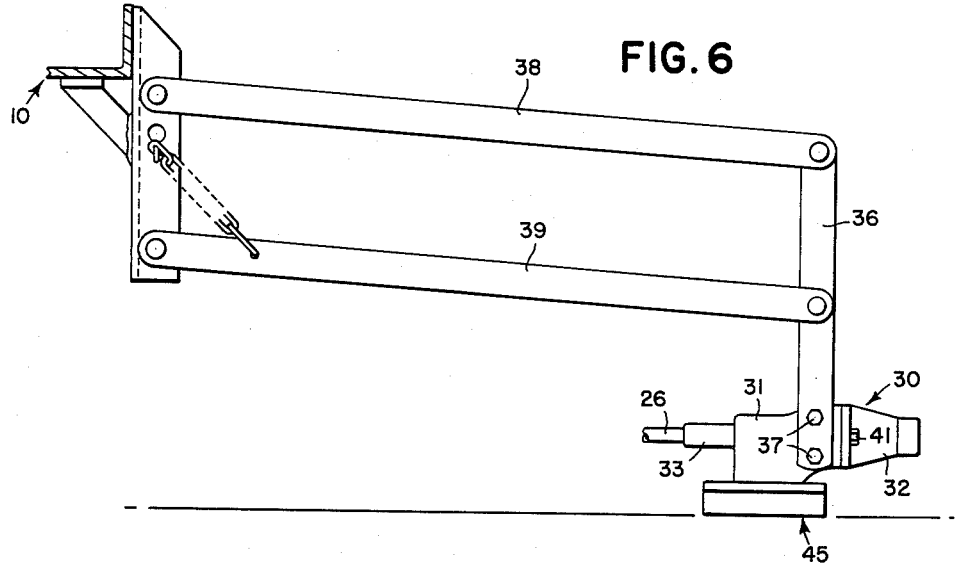
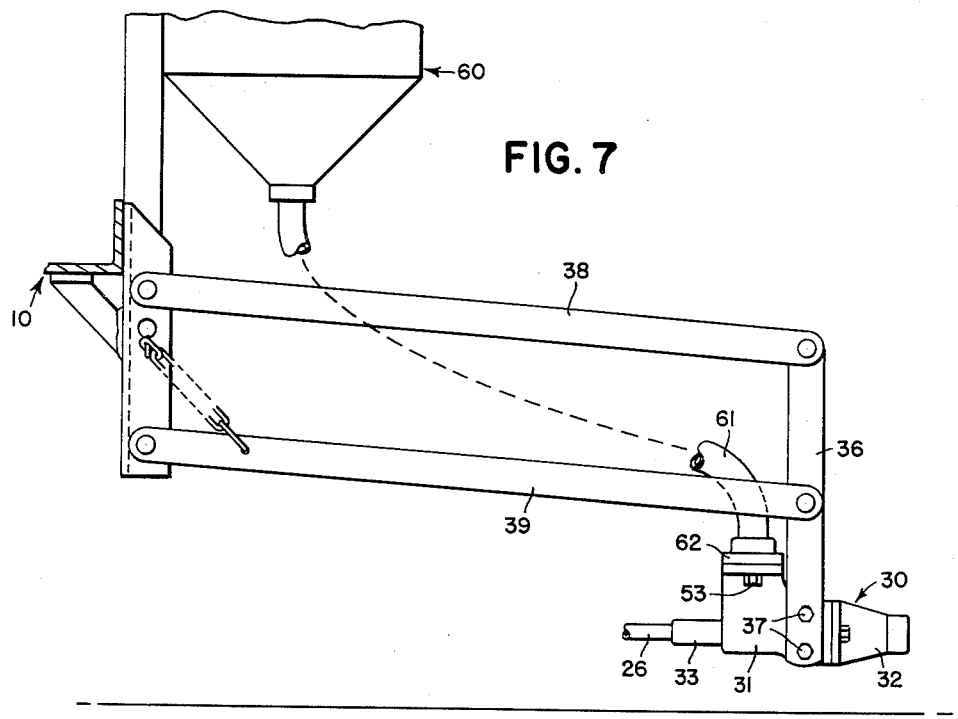
INVENTOR.
CURTISS L. COOK
ATTORNEYS

United States Patent Office 2,978,856
Patented Apr. 11, 1961

2,978,856

MOWER WITH SANDBLAST CUTTING MEANS

Curtiss L. Cook, Syracuse, N.Y., assignor, by mesne assignments, to Deere & Company, a corporation of Delaware Filed Jan. 6, 1958, Ser. No. 707,403

11 Claims. (Cl. 56—25)

The present invention relates generally to plant cutting or disintegrating means and is particularly concerned with highway maintenance apparatus designed to cut or reduce plant growth, such as weeds, grass and the like, growing along the roadside.

The object and general nature of the present invention is a provision of novel means for cutting or reducing plant growth along the roadside and especially means to direct a blast of air and abrasive against the plant growth to cut off or reduce the latter, in spite of roadside obstructions, such as posts, guard rails, reflector supports, and the like. More specifically, it is a feature of this invention to provide a tractor-carried apparatus that includes an air compressor carried by the tractor, nozzle means for directing an air blast generally laterally of the tractor against the plant growth it is desired to cut or reduce, and means for supplying abrasive material to said air blast so that the latter propels the abrasive material into the plant growth with sufficient velocity to cut or reduce the plant growth. A further feature of this invention is the provision of new and improved nozzle means whereby abrasive material may be carried by the tractor and controllably delivered into the air blast to perform the plant-reducing action. Further, it is a feature of this invention to provide means connected with the nozzle means and constructed and arranged to pick up abrasive material from the side of the road or highway and forcibly propel the latter against the plant growth to reduce or disintegrate the latter.

These and other objects and advantages of the present invention will be apparent to those skilled in the art after a consideration of the following detailed description, taken in conjunction with the accompanying drawings in which two embodiments of the present invention have been shown by way of illustration.

In the accompanying drawings:

Fig. 1 is plan view, partly diagrammatic in character, showing the principles of the present invention as incorporated in a highway or industrial type tractor carrying an air compressor and associated air blast means.

Fig. 2 is an enlarged fragmentary sectional view taken generally along the line 2—2 on Fig. 1 and showing one form of nozzle means.

Fig. 3 is an end view taken generally along the line 3—3 of Fig. 2.

Fig. 4 is a view similar to Fig. 2, showing an alternate form of the present invention.

Fig. 5 is a top view, taken generally along the line 5—5 of Fig. 4.

Fig. 6 is a fragmentary elevation of the parallel link means connecting the nozzle means of both Figs. 1 and 2 with the tractor.

Fig. 7 is a view similar to Fig. 6 showing the parallel link means connecting the nozzle means of Fig. 4 with the tractor.

Referring first to Fig. 1, the principles of the present invention have been illustrated as incorporated in an industrial tractor 10 of conventional construction, having front wheels 11, rear wheels 12, and suitable power actuated means that include a power take off unit 13. Mounted at the rear of the tractor, as by the usual hitch links 14 and 15, is a compressor unit 18 that has a pressure tank 19, and an air compressor unit 21 driven in any suitable way, as by belt and pulley means 22, from the power take off unit 13 of the tractor. The compressor unit 18 may be of any suitable construction and, in one form of the invention, may comprise a tank and compressor that are capable of supplying and handling about 40 cu. ft. of air per minute at about 80 lbs. pressure per sq. in. Air pressure, under the control of valve means 25 is conducted from the tank 19 by a pressure tube 26 to a nozzle unit 30. The latter unit, as best shown in Fig. 2, comprises a nozzle head casting or body 31 having a discharge nozzle 32 into which a tube 33 extends the tube 33 opening into an inlet area 34 that in operation is under suction, or reduced pressure, due to the high velocity of air directed by the tube 26 through the nozzle section 32.

The unit 30 is supported on the tractor by a pair of vertical straps 36 connected, as by removable cap screws 37, to the body 31 of the nozzle unit. The upper portions of the supporting straps 36 are connected to vertically swingable upper and lower link members 38 and 39 that at their laterally inner ends are pivotally connected with the tractor. Preferably, but not necessarily, the link members 38 and 39 are in the nature of A frames so that the nozzle unit 30 is capable of generally vertical movement relative to the tractor but is held against fore and aft displacement with respect thereto. The nozzle section 32 is removably conneced to the body 31 by cap screws 41 or other suitable means, it being understood that in handling abrasive material, the nozzle 32 may be subjected to relatively rapid wear, and hence consequent relatively frequent replacement may be required.

The area of suction or reduced pressure, indicated at 34 in Fig. 2, is extended laterally inwardly and downwardly into communication with an inlet chamber 43 that is covered by a screening member in the form of a plate 45 having plurality of abrasive-screening openings 46 and upwardly extending end shoe sections 47 and 48. The plate 45 is removably connected to flanges 51 on the lower portion of the casting 31 by any suitable means, such as cap screws 53. The shoe portions 47 and 48 serve as guides and accommodate sliding movement of the unit 30 along the surface of the ground.

In operation, as the tractor is driven along the edge of the highway, the nozzle unit 30 passes along the ground just outside the pavement and the nozzle section 32 is directed laterally outwardly toward and generally normal to the plant growth that it is desired to reduce or eliminate. The tractor power take off shaft unit 13 is operatively connected to drive the compressor 21 so as to maintain the desired air pressure in the tank 19. The valve 25 is opened to deliver air under pressure through the tube 26 to the nozzle 32. This air blast causes suction or reduced pressure in the chamber 34 and hence abrasive material loosened by the sliding of the shoe plate 45 along the ground can be picked up from the roadside and drawn into the air blast, being then directed by the latter against the plant growth. Such abrasive particles have sufficient velocity imparted thereto by the air blast so that they reduce or disintegrate the plant growth contacted thereby. It has been found that natural roadside drainage tends to deposit finer particles of sand, gravel, cinders, and stone at a point just outside of the pavement, and by arranging the nozzle unit 30 so that the plate 45 slides along this area of the shoulder, abrasive particles can be readily picked up by the suction in the nozzle unit and propelled by the air blast against the plant growth to reduce or disintegrate it, as desired.

It will be observed from Fig. 3 that when the orifice plate 45 is caused to slide over the ground, the movement of the latter in contact with the ground will serve to provide abrasive particles that can be drawn into the air blast. If however, the character of the roadside shoulder is not that which provides the required amount or character of abrasive soil particles, then the arrangement shown in Figs. 4–5 may be adopted, in which abrasive from a hopper is drawn into the air blast.

In the modified form of the present invention shown in Figs. 4 and 5, the hopper 60 (Fig. 1) is mounted along one side of the tractor and is arranged to deliver abrasive, such as sand and/or the like, into a tube 61. The latter extends from the tank 60 to a flanged part 62 that is fixed to the body 31 by the cap screws 53, the unit 30 being turned over or reversed through 180°, as can be seen from Fig. 4, so as to dispose the inner chamber 43 upwardly, whereby sand or other abrasives delivered from the hopper 60 into the tube 61 enters the suction zone 34 and is thus brought into the air blast delivered to the nozzle 32 by the air pressure tube 26. When arranged in this way, any suitable means may be provided for supporting the air blast unit 30 at the desired level. For example, the links 38 and 39 may be connected with the tractor in any suitable way.

Preferably, I employ such abrasives as No. 6 screened sand, which has a maximum diameter of around 0.132 inch, which is considerably larger than particles used in conventional sand blast work. The larger abrasive particles are preferred for plant reduction work since the relatively high velocity air stream can impart sufficient velocity to such particles to insure that they will cut or reduce the plant growth throughout an acceptable cutting range. Since both the nozzle unit 32 and the ground plates 45 are subjected to considerable wear, it will be noted that they are easily and quickly replaceable when necessary.

While I have shown and described above the preferred structure in which the principles of the present invention have been incorporated, it is to be understood that my invention is not to be limited to the particular means, shown and described above, but that, in fact, widely different means may be employed in the practice of the broader aspects of my invention. For example, I may use a wheel mounted towed power driven compressor, which is usually a part of available road maintenance equipment, instead of the compressor of the mounted type shown in Fig. 1.

What I claim, therefore, and desire to secure by Letters Patent is:

1. A highway maintenance device for cutting weeds and the like at the side of the highway, said device comprising a mobile support movable along the edge of the highway, a source of air under pressure carried by said support, a nozzle for directing an air blast toward the plant growth at the side of the highway, means supporting said nozzle on the portion of said support adjacent the edge of the highway and in a position close to the ground and directed laterally outwardly of the mobile support generally parallel to the ground toward weeds and the like at the edge of the highway, and means connected with the nozzle for entraining abrasive particles into said air blast.

2. A highway maintenance device for cutting weeds and the like at the side of the highway, said device comprising the combination of a tractor, an air compressor supported on the tractor, means driven by the latter to operate said compressor, an air blast nozzle movably carried by with the tractor and connected with the air compressor for receiving air under pressure therefrom, a container for abrasive material carried on the tractor, and conduit means connecting said container with said nozzle to supply abrasive to said air blast.

3. A highway maintenance device for cutting weeds and the like at the side of the highway, said device comprising the combination of a tractor, an air compressor supported on the tractor, means driven by the latter to operate said compressor, an air blast nozzle movably carried by the tractor and connected with the air compressor for receiving air under pressure therefrom, and means connected with said nozzle and energized by the associated air blast for picking up abrasive material from the side of the highway and delivering it into said air blast.

4. The invention set forth in claim 3, further characterized by ground engaging slide means adapted to be moved along the surface of the ground for loosening soil materials to facilitate their being drawn into said air blast.

5. The invention set forth in claim 4, further characterized by said slide means including apertured means for screening out the larger soil particles so as to prevent their inclusion in said air blast.

6. The invention set forth in claim 4, further characterized by said abrasive pick-up means being removable and said nozzle being reversible when said pick-up means is removed.

7. A highway maintenance device for cutting weeds and the like at the side of the highway, said device comprising the combination of a tractor, an air compressor supported on the tractor, means driven by the latter to operate said compressor, an air blast nozzle connected with the air compressor for receiving air under pressure therefrom, means connecting said nozzle with the tractor for generally vertical movement relative thereto and generally parallel to the ground, said last named means including generally parallel links connected with the tractor and nozzle and disposing said nozzle in a position extending generally directly outwardly from the tractor and generally parallel to the ground, said nozzle being movable to different parallel positions, and means to supply abrasive material to said air stream for inclusion therein so as to reduce the height of plants growing at the side of the highway and toward which the nozzle is directed.

8. A highway maintenance device for cutting weeds and the like at the side of the highway, said device comprising the combination of a tractor, an air compressor supported on the tractor, means driven by the latter to operate said compressor, an air blast nozzle connected with the air compressor for receiving air under pressure therefrom, means connecting said nozzle with the tractor for generally vertical movement relative thereto and generally parallel to the ground, said last named means including generally parallel links connected with the tractor and nozzle and disposing said nozzle in a position extending generally directly outwardly from the tractor and generally parallel to the ground, said nozzle being movable to different parallel positions, and means to supply abrasive material to said air stream for inclusion therein, so as to reduce the height of plants growing at the side of the highway and toward which the nozzle is directed, and ground engaging means supporting said nozzle a predetermined distance above the ground.

9. In a highway maintenance device for cutting weeds and the like at the side of the highway, the improvement comprising an air blast nozzle having an outlet, said nozzle having passage means therein including a portion of reduced cross section, inlet means communicating with said portion, and an apertured part fixed over said inlet means.

10. In a highway maintenance device for cutting weeds and the like at the side of the highway, the improvement comprising an air blast nozzle having an outlet, passage means therein including means forming a portion of reduced cross section, an inlet plate having a plurality of abrasive-screening apertures disposed over said inlet means, and means removably fixing said inlet plate to said nozzle.

11. The invention set forth in claim 10, further characterized by upturned end sections on said inlet plate acting to accommodate sliding movement of said plate over the surface of the ground.

References Cited in the file of this patent

UNITED STATES PATENTS

| | | |
|---|---|---|
| 692,253 | Dodge | Feb. 4, 1902 |
| 1,938,264 | Templeton | Dec. 5, 1933 |
| 2,240,168 | Adkisson | Apr. 29, 1941 |
| 2,503,743 | Keefer | Apr. 11, 1950 |
| 2,508,766 | Morel | May 23, 1950 |
| 2,571,874 | Hale | Oct. 16, 1951 |
| 2,645,890 | Spedding | July 21, 1953 |
| 2,680,946 | Rousey | June 15, 1954 |
| 2,684,558 | Harris et al. | July 27, 1954 |
| 2,699,025 | Goss | Jan. 11, 1955 |
| 2,700,860 | Barber | Feb. 1, 1955 |
| 2,753,664 | Garver | July 10, 1956 |
| 2,763,965 | Stokes | Sept. 25, 1956 |
| 2,837,874 | Hunter | June 10, 1958 |

FOREIGN PATENTS

| | | |
|---|---|---|
| 2,442 | Australia | Feb. 3, 1905 |
| 23,902 | Australia | Aug. 19, 1926 |
| 15,892 | Australia | Aug. 8, 1929 |